United States Patent [19]
Willham et al.

[11] Patent Number: 5,322,034
[45] Date of Patent: Jun. 21, 1994

[54] LIVESTOCK RECORD SYSTEM

[75] Inventors: Richard L. Willham, Ames; Robert J. Weber, Boone; Marwan M. Hassoun, Ames, all of Iowa

[73] Assignee: Iowa State University Research Foundation, Inc., Ames, Iowa

[21] Appl. No.: 877,461

[22] Filed: May 1, 1992

[51] Int. Cl.$^5$ .............................................. A01K 11/00
[52] U.S. Cl. ................................ 119/174; 119/51.02; 340/573; 340/825.15; 340/825.55
[58] Field of Search ................... 119/174, 51.02; 128/903; 340/825.15, 825.54, 825.55, 870, 573

[56] References Cited

U.S. PATENT DOCUMENTS

| | | |
|---|---|---|
| 3,971,362 | 7/1976 | Pope et al. |
| 4,065,753 | 12/1977 | Paul, Jr. |
| 4,262,632 | 4/1981 | Hanton et al. |
| 4,333,072 | 6/1982 | Beigel |
| 4,399,821 | 8/1983 | Bowers ............... 340/573 |
| 4,463,353 | 7/1984 | Kuzara |
| 4,475,481 | 10/1984 | Carroll |
| 4,510,495 | 4/1985 | Sigrimis et al. |
| 4,514,731 | 4/1985 | Falck et al. |
| 4,618,861 | 10/1986 | Gettens et al. |
| 4,630,044 | 12/1986 | Polzer |
| 4,724,427 | 2/1988 | Carroll |
| 4,739,328 | 4/1988 | Koelle et al. ............... 342/44 |
| 4,837,568 | 6/1989 | Snaper |
| 4,854,328 | 8/1989 | Pollack |
| 4,865,044 | 9/1989 | Wallace et al. ............... 340/573 |
| 4,937,581 | 6/1990 | Balwin et al. ............... 340/825.54 |
| 5,008,661 | 4/1991 | Raj ............... 340/825.55 |
| 5,028,918 | 7/1991 | Giles et al. ............... 119/51.02 |
| 5,055,659 | 10/1991 | Hendrick et al. ............... 340/825.54 |

FOREIGN PATENT DOCUMENTS 9005448  5/1990  PCT Int'l Appl. ............... 119/51.02

OTHER PUBLICATIONS

Tom Curl, "Electronic Branding is on the Way", *Progressive Farmer*, p. 52, Jul. 1974.
"Destron/IDI" Product brochure (1990).

*Primary Examiner*—Gene Mancene
*Assistant Examiner*—Todd E. Manahan
*Attorney, Agent, or Firm*—Leydig, Voit & Mayer, Ltd.

[57] ABSTRACT

An electronic livestock record system stores the individual animal's identification and performance data on a programmable electronic identification and data storage module carried with the animal so that the animal's identification, the animal's performance data and the animal itself become one. The system includes a programmable electronic identification and data storage module carried by the animal, and a reading and recording device which communicates with the electronic identification and data storage module.

23 Claims, 3 Drawing Sheets

LIVESTOCK RECORD SYSTEM

FIELD OF THE INVENTION

The present invention relates generally to a livestock record system, and more particularly to a system and method in which the animal's identification, data associated with the animal, and the animal itself, are one.

BACKGROUND OF THE INVENTION

Since 1960, the livestock industry has embraced the concept of genetic evaluation of livestock based on objective measures of economically important traits. This transition from purely subjective visual appraisal to genetic predictions based on objective measures began slowly, but today is routinely used for breeding stock in some species. Genetic evaluation has been accomplished in family owned breeding herds tied together for technology support by breed organizations that belong to federations that have provided guidelines for genetic evaluation. These breeding herds and their associations have demonstrated the desirability for making genetic change by selecting certain animals to use as parents of the next generation.

More recently, since 1980, the livestock industry and more particularly certain livestock species, have embraced the concept of value-based marketing of animals and their products. In a value-based marketing system, the pricing of livestock is based on the performance value of the livestock such that the livestock species in the industry can respond to current and future consumer demand. The value-based marketing system requires record keeping and data collection systems that include coverage of breeding stock, commercial stock, and actual product value at the processing level. A codified program based on a data collection system would allow for a fair comparison of an animal's performance with contemporary livestock groups tied together by sophisticated statistical analyses using entire data bases of livestock breeds.

Currently, codified performance programs are operating in the beef, dairy, swine, and sheep industries, but except for the dairy industry the majority of records involve only breeding stock, not commercial stock. Electronic identification devices and systems have provided a good method for merely providing identification of livestock for such codified performance programs. Typically, electronic identification systems utilize a passive electronic identification device which is induced to power up and transmit its identification signal by an externally radiating source. These passive electronic identification devices may be a transponder carried with the individual animal on a collar (for feeding systems) as illustrated and described in Carroll U.S. Pat. No. 4,475,481, issued Oct. 9, 1984, entitled "Identification System" and in Kuzara U.S. Pat. No. 4,463,353, issued Jul. 31, 1984, entitled "Animal Feeding and Monitoring System," or a transponder implanted in the animal as illustrated and described in Pollack U.S. Pat. No. 4,854,328, issued Aug. 8, 1989, entitled "Animal Monitoring Telltale and Information System" and in Hanton U.S. Pat. No. 4,262,632, issued Apr. 21, 1981, entitled "Electronic Livestock Identification System." Electronic identification devices have not, however, been widely accepted as a means for running a codified performance program at the field level on commercial livestock nor actual product value when processed. Due to the difficulty in collecting livestock performance records using current methods of electronic identification only, industry wide participation has not developed. Industry wide participation is awaiting a simple record delivery system.

There thus remains a need for a simple record keeping and delivery system for gathering performance information of the livestock species and for the manipulation and assimilation of that information into values on which to base a pricing mechanism for livestock and their products. The system must be capable of coordinating industry activity to create global consumer demand for healthful animal products that can be produced profitably. A simple high-technology information system that is easily used and adapted by the livestock industry, industry-wide participation in information gathering and processing, and industry-wide dissemination of values for use in pricing and decision making coupled with a central information collection and dissemination organization is therefore needed.

OBJECTS AND SUMMARY OF THE INVENTION

Accordingly, the primary aim of the present invention is to provide a high-technology, easy to use, field level livestock record system which will be a foundation for a value based marketing system for livestock. A further object of this invention is to provide a livestock record system that will electronically identify an individual animal, store the animal's performance and predicted performance records, and monitor the animal's health, so that the animal and its records are one. A related object is to provide a livestock record system using the livestock animal itself as a mobile record capable of receiving changeable information.

A further object is to provide a self-powered, electronic data storage module which is carried with a animal and a self-powered, portable device which can read and record on the electronic data storage module.

Another, more specific, object of the present invention is to store identification and performance data on an animal by utilizing an implantable programmable electronic identification and data storage module.

These and other features and advantages of the invention will be more readily apparent upon reading the following description of a preferred exemplified embodiment of the invention and upon reference to the accompanying drawings.

The invention accomplishes these objectives by use of an electronic identification and data storage module that is, preferably, implanted in the individual animal. The electronic module has, in one embodiment, a unique encoded identification number to provide identification of the animal. The electronic module also contains defined space for specified data fields which permanently store the animal's performance and predicted performance records. The electronic module is read and controlled by an external reading and recording device. This device can retrieve and store data from the electronic module and download the data to a computer. This device can also receive data from a computer and transmit the data to the electronic module for storage.

The electronic module may be powered by an extended-life battery and the reading and recording device may be powered by a rechargeable battery.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

This invention provides a high technology livestock record system which is easy to use, which can be used in the field for field level identification of the animal and for storage of information about the animal, and in which the animal's identification, performance data relating to the animal, and the animal itself are one. Thus, in accordance with the invention the livestock animal is itself a mobile record keeper capable of receiving changeable information.

The livestock record system of the present invention includes a programmable electronic identification and data storage module for identifying and monitoring the animal, an external remote reading and recording device (reader/recorder) capable of communicating with the programmable electronic identification and data storage module to transmit information to the module, and to read information contained in the module, and a computer station to store data relating to the animal.

The livestock record system of the present invention is capable of providing identification and performance information about livestock to a central information center. The central information center collects, collates, assimilates and utilizes the performance information to enhance the profitable production of healthful animal products that meet consumer demands. The center can serve the several livestock species that comprise the livestock industry by providing bio-economic values for use by industry participants. The information center can provide and disseminate genetic predictions for breeding stock, performance predictions for commercial stock, and actual product values from the processor. The performance predictions and actual values can be the basis of a pricing system that coordinates industry response to consumer demand. Input information on the animals enters the center through the high technology livestock record system of the present invention. After incorporation into the data base, the best predictions of bio-economic values exit the center for immediate use by the participants who are in competition to profit by meeting consumer demand. The ultimate beneficiary is the consumer of healthful animal products at competitive prices.

Figure 1:
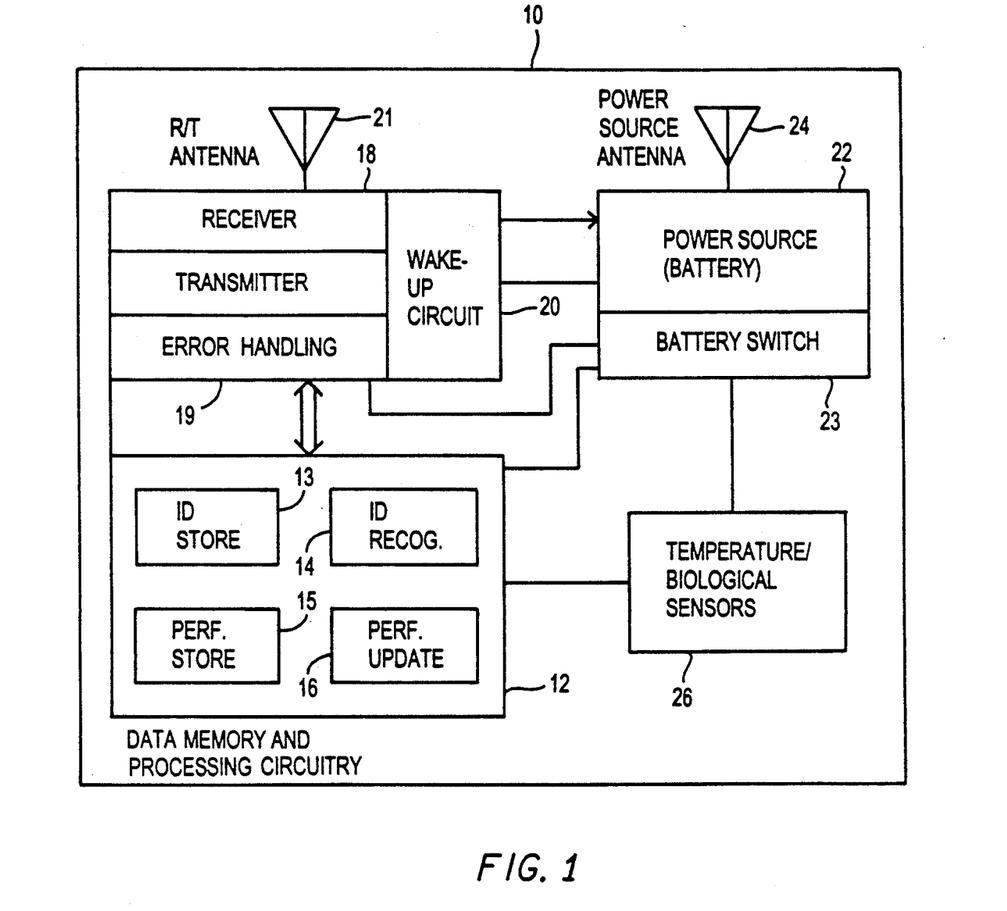
FIG. 1 is a block diagram of an electronic identification and data storage module for storing unique identification information for an animal and related performance data of the animal.

The programmable electronic identification and data storage module 10 for receiving, recording and processing information relative to an animal is shown in the block diagram of FIG. 1. The module 10 is comprised of a data storage and processing section 12 which includes data memory and data processing circuitry for recording and storing identification, performance and predicted performance information relating to the livestock animal. As shown in FIG. 1, data storage and processing section 12 includes an identification storage section 13, an identification recognition section 14, a performance storage section 15, and a performance update section 16. Memory storage in module 10 can be, for example, magneto-resistive memory which would prevent loss of data in cases of power failure. The module 10 also includes a receiver and transmitter section 18 for receiving communications from the reader/recorder and for transmitting information to the reader/recorder. As can be seen, section 18 also includes error handling circuitry 19 and wake-up circuitry 20 as explained in greater detail below. Additionally, module 10 includes a receiving and transmitting (R/T) antenna 21 to facilitate the transmission of information to and from the reader/recorder.

As illustrated in FIG. 1, the receiver and transmitter section 18 communicates with the data storage and processing section 12 so that information received by the receiver may be recorded in data storage and processing section 12 and information stored in data storage and processing section 12 may be transmitted to the reader/recorder. Additionally, prior to the transfer of information to data section 12, error handling circuitry 19 can be used to provide a check on the integrity of the transmitted a check on the integrity of the transmitted information such as transmission or reception errors.

As shown in FIG. 1 both the receiver and transmitter section 18 and the data storage and processing section 12 are powered by a power source such as a battery 22. If magneto-resistive memory is utilized, it is possible to minimize power consumption by removing power to module 10 when it is not being accessed. In order to accomplish this, a battery switch 23 is provided along with a power source antenna 24 to remove and restore power to module 10 at appropriate times. Thus, when power is restored to module 10, battery 22 operates in conjunction with wake-up circuitry 20 which signals the various sections of module 10 upon power-up. Module 10 may also include a health monitoring system such as temperature and biological sensors 26 for monitoring the well-being and health of the animal. Sensors 26, when included in module 10, are also battery powered and communicate with the data storage and processing section 12 to provide information about the body temperature and other biological aspects of the animal which can be transmitted to the reader/recorder.

The module 10 is carried by the animal, and is preferably implanted in the animal. In this way the animal's identification, the animal's performance records, and the animal itself are one. Also, the livestock animal itself is used as a mobile record and is capable of receiving continuously updatable information.

It is highly desirable that the module 10 can be read and recorded to at relatively long distances. In the preferred embodiment, the antenna 21 and receiver/transmitter section 18 enable module 10 to be read from a distance of on the order of at least about fifty feet and enables the module 10 to be recorded to from a distance on the order of at least about five feet.

In the preferred embodiment, the programmable electronic identification and data storage module 10 comprises a programmable electronic chip which includes a number of fixed and programmable defined locations for recording and storing information. The module 10 includes a unique animal identification number that is used to identify the animal. Preferably, as shown in FIG. 1, the module 10 stores the identification number in identification storage section 13, with the number being permanently fixed in the module and unalterable. In that regard, identification recognition section 14 includes circuitry which enables the identification number to be read from identification storage section 13. The module 10 further includes defined locations for recording important characteristics about the animal. For example, defined locations for recording parentage, both sire and dam, are included on the module. The module may further include a series of defined locations to record sequences of performance values, their adjusted values, and, preferably, predicted values. As shown in FIG. 1, these defined locations are included in performance storage section 15. In order to access the data stored in section 15, performance update section 16 is included so that this data can be reviewed or updated, etc. In the preferred embodiment, each location starts with a production unit code, the Julian date, and a contemporary group number followed by a sequence of performance values for, by way of example, birth, weaning, on test, off test or slaughter data.

In the preferred embodiment, the module 10 will generate information signals transmittable to a display in the form of a screen on the reader/recorder. The screen will include, in the case of performance values, a brief description of the information required for input. In case of identification, the identification is, of course, already established and no input is required. Thus, for example, the module may provide information signals for a number of screens including animal identification, birth information, weaning information, stocker information, feedlot information and carcass information. It is preferred that the screens display both actual performance values and predicted performance values.

By way of example and not in limitation, the display screen may be configured as follows. The animal identification screen may include, for example, the animal identification number, the birth date, sex, registration, sire number and dam number. The birth screen may include the birth location, calving ease, birth weight, birth deviation and birth prediction. The weaning screen may include the wean location, wean date, wean weight, wean height, weight deviation, height deviation and growth prediction. The stocker screen may include stocker locations, date received, initial weight, final weight and date, gain deviation, and growth prediction. The feedlot screen may include feedlot location, date and initial weight, date and final weight, gain deviation, growth prediction, predicted amount and quality of product in the carcass. Finally, the carcass screen may include slaughter location and date, carcass weight, actual amount and actual quality of the product.

For breeding females, a module with a different series of defined locations than described above is preferably used. The breeding female module need not have a permanent identification number, for example, as the identification number may be recorded from the module that was implanted in the animal at birth. The series of defined locations in the breeding module may include, for example, a current reproduction screen and several consecutive cycle screens with both female and calf information. The current reproduction screen may include the breeding date and service sire for each breeding attempt. Each of the consecutive cycle screens may include the date, weight, height, pregnancy, size prediction, calf birth date and calf number.

Figure 2:
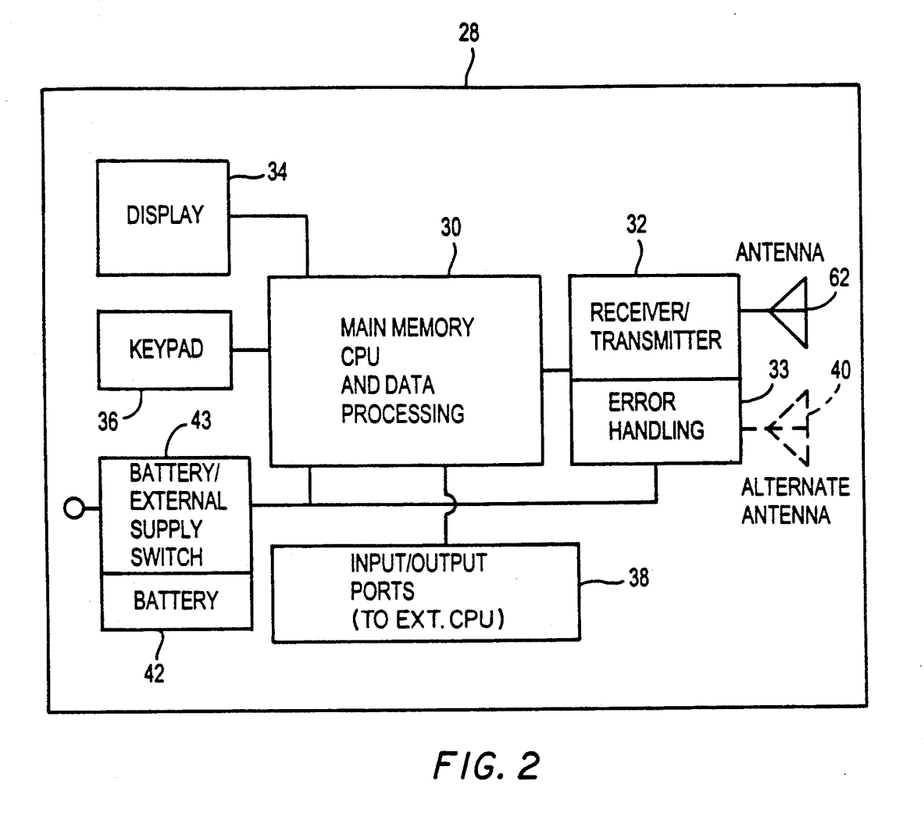
FIG. 2 is a block diagram of the reading and recording device.

The reader/recorder device 28 for transmitting data to or receiving data from the programmable electronic identification and data storage module 10 is shown in the block diagram of FIG. 2.

The reader/recorder device 28 is comprised of a main memory and data processing section 30 which includes data memory and data processing circuitry for reading, recording and storing identification and performance data relating to the animals, and for adding or changing data relating to the animals. The reader recorder device 28 also includes a receiver/transmitter section 32 for receiving communications from and for transmitting communications to the electronic identification and data storage module 10. Similar to module 10, error handling circuitry 33 is used to maintain the integrity of the transmitted information. Additionally, reader/recorder device 28 includes a display screen 34 for displaying information received from the module 10 and from the section 30 and a keypad 36. The keypad 36 is comprised of a plurality of number and function buttons for inputting and controlling the communications of the reader/recorder device 28 with the programmable electronic identification and data storage module 10.

The reader/recorder device 28 preferably also includes input/output ports 38 for transmitting information acquired by the reader/recorder device 28 to a data information link or computer and for receiving information from a data information link or computer. The reader/recorder device 28 includes an antenna 62 for the receiver transmitter 32 to improve the useful range of the reader/recorder device 28. If required, an alternate antenna 40 is provided. Desirably the reader/recorder device 28 includes an input port to receive information regarding traits that may be electronically measured, such as weight. Finally, the reader/recorder device 28 includes a battery 42 and a battery/external supply switch 43 so that the reader/recorder can be self-contained and recharged when necessary.

The main memory and data processing section 30 is central in terms of function to the reader/recorder device 28. The receiver/transmitter 32, display screen 34, keypad 36, and input/output ports 38 each communicate with the main memory and data processing section 30. Information in section 30 is viewable on the display screen 34, is controlled by the keypad 36 and is transmitted from the reader/recorder device 28 to the programmable electronic identification and data storage module 10 through the transmitter 32 or it is transmitted to a computer through the input/output port 38. In the preferred embodiment, section 30 also includes means for detecting and signalling errors such as data input errors. Such means (not shown) may include error detection software which monitors keypad input and provides an error signal to the display screen upon detection of data that does not conform to an expected norm.

Figures 3A, 3B:
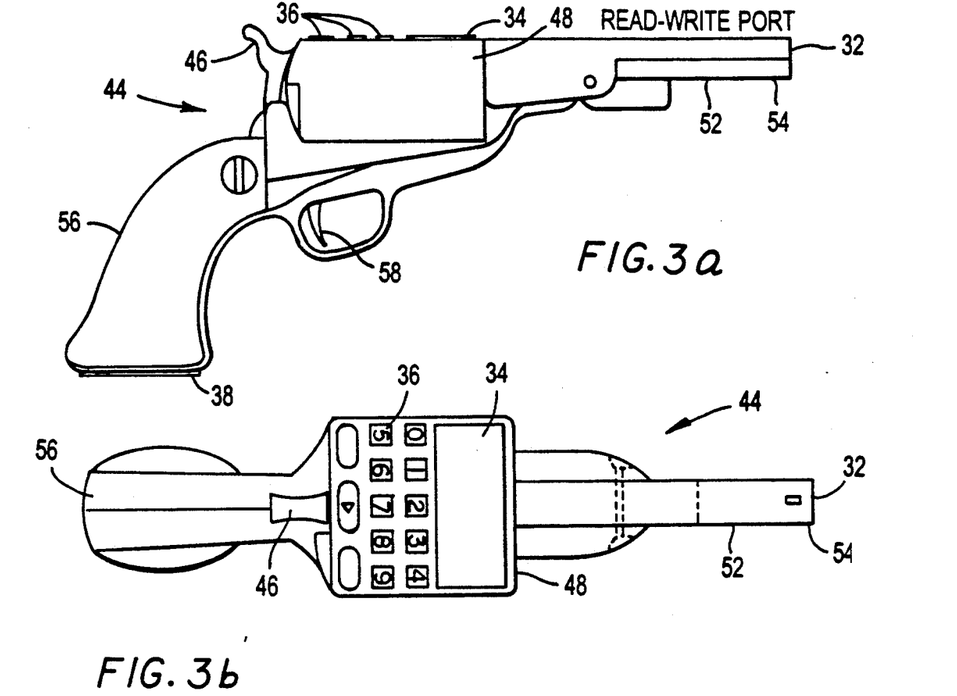
FIGS. 3a and 3b illustrate a hand-held portable reader and recorder device in pistol-shape.

As shown in FIGS. 3a and 3b, in its preferred embodiment, the reader/recorder device 28 is in the shape of a pistol 44. The pistol-shaped reader/recorder device 44 includes a hammer 46 to turn the device 44 on and off. In the illustrated embodiment, the device is off when the hammer is up and the device is on when the hammer is down. The keypad 36 and display screen 34 are located on the upper surface of the barrel 48 of the pistol to provide ease of access and ease of viewing. The receiver/transmitter 32 is located at the end 54 of the shaft 52 of the pistol. The handle 56 of the pistol includes input/output port 38 for communication with a computer, and also includes the battery 42 and the battery/external supply switch 43.

Figure 4:
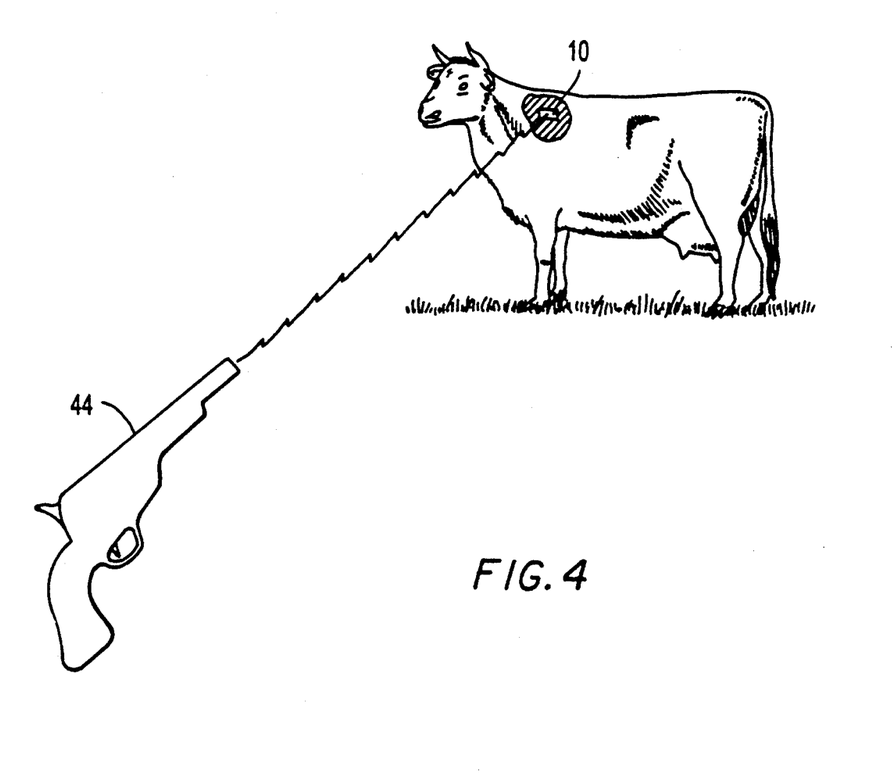
FIG. 4 illustrates operation of the livestock record system of the present invention.

The pistol also includes an operating trigger 58 which is pulled toward the handle to read information from the programmable electronic identification and data storage module 10 or to write to the module 10. Thus, in operation, as shown in FIG. 4, the hammer 46 is cocked, that is, it is pulled down, to turn on the reader/recorder device 44. The device 44 is then aimed at the animal from which information is to be read, and the trigger 58 is pulled to read information from the programmable electronic identification and storage module 10 implanted in the animal. The information may be manipulated, or new information added, by use of the keyboard 38. The programmable electronic identification and storage module 10 may be written to by pointing the shaft 52 of the pistol 44 at the animal and pulling the trigger 58. A suitable read/write switch (not shown) is included to insure that the desired function is enabled when the trigger 58 is pulled.

The livestock record system of the present invention further includes computer means for permanently storing data from the programmable electronic identification and data storage module 10. The computer means includes means for transmitting and reading data from the reader/recorder device and means for storing information from the reader/recorder device which has been received from or transmitted to the programmable electronic identification and data storage module 10. The computer means may be any of a number of commercially available microprocessors with suitable storage disk capacity and performance characteristics for the intended application.

By way of example, the livestock record system of the present invention may be used to identify and monitor breeding stock herds where detailed records are kept, as well as commercial stock herds, which may require less information.

For breeding stock herds, at selection, each breeding female receives a new blank programmable electronic identification and data storage module 10 on which is recorded her unique animal number and her parentage. Defined locations are available for sequences of weight, height, and condition score at designated times during the yearly reproductive cycle. Also, there are defined locations for breeding seasons such that breeding dates and service sire's animal number can be recorded along with the results of a later pregnancy exam.

At the birth of an offspring animal, a numbered programmable electronic identification and data storage module 10 is implanted into the offspring, and by reading the dam's breeding female programmable electronic identification and data storage module, the sire and dam numbers are then recorded on the animal's programmable electronic identification and data storage module after breeding dates are found to be logical with the birth date. The offspring animal number is recorded on the breeding female programmable electronic identification and data storage module. Animal data may include sex, weight, height and the like. These data are recorded on the programmable electronic identification and data storage module 10 and all new information is stored in the reader/recorder and subsequently transferred to and stored on the master date file of the computer, and sent to the central information center.

At the weaning of the offspring animal, the electronic identification and data storage module is read, the new information is recorded on the electronic identification and data storage module after being logically compared, and the entire animal's record placed in the reader/recorder for subsequent transmission to the microcomputer and on to the central information center. The center then returns the EPDs of the animals from the unit for birth and weaning traits. At either the next working of animals or on return of the EPDs, the EPDs along with the animal numbers are put on the reader/recorder and transferred by radio wave to the electronic identification and data storage module in all animals.

A similar sequence may be followed for on test information and then again at market age, depending on species. The final EPDs, which include measures on body composition as well as weights, are recorded on the electronic identification and data storage module and breeding stock are then offered for sale with their performance information, EPDs and all. Females sold get a breeding female electronic identification and data storage module in the herd of the buyer. Bulls sold retain their animal electronic identification and data storage module which in time will loose its power, but the unique animal number can still be read since it comes imprinted in the programmable electronic identification and data storage module.

For commercial stock herds, in which minimum performance recording is used, at replacement selection, each female receives a breeding female electronic identification and data storage module on which is recorded her unique animal number and her parentage which may be only a breed combination record. No information needs to be recorded on the female. The breeding dates may only be the beginning and end of the season and the service sire identified only by breed combination.

At the birth of the animal, no record need be kept. But at weekly intervals or at the end of the birth season, all animals must receive an animal electronic identification and data storage module. Then the information from the breeding electronic identification and data storage module of the dam (her animal number and any information on the sire) needs to be recorded on the offspring electronic identification and data storage module after clearly identifying the dam-offspring group. The animal number must be recorded on the dam module also. No birth performance data needs to be recorded.

At the weaning of the animal, the electronic identification and data storage module is read, at least the weight is recorded on the module, the age adjusted weaning weight using an assigned birth weight is calculated in the reader/recorder and also recorded on the module. The information is placed in the reader/recorder for subsequent transfer to the microcomputer and possibly on to the central information center. A weaning summary may be prepared and may include weight, and predictions based on the weights and other measures that best predict performance (weight gain) and body composition at designated times. This constitutes specification of the product offered for sale.

The same logic is followed for the second phase of the market animal's life. At market age or weight, various records are recorded on the electronic identification and data storage module and transferred to the microcomputer and possibly on to the central information center. A final summary that includes measures of body composition, the weights and best predictions of carcass weight and composition may be prepared. This constitutes specification of the product offered for sale.

At slaughter, the actual measures of composition including amount and the quality of product are recorded on the programmable electronic identification and data storage module, and transferred to a microcomputer from the reader/recorder. The processor may use this information for paying for the animals of the group and merchandizing the product. The programmable electronic identification and data storage module is extracted from each animal carcass and either is sent or information thereon is transmitted to the central information center and entered into a central data bank.

The present invention thus provides a high-technology, easy to use, field level livestock record system that will electronically identify an individual animal, store the animal's performance and predicted performance records, and monitor the animal's health. In the system, the animal and its records are one, and the animal itself is a mobile record keeper capable of receiving and transmitting continuously updatable information. The livestock record system of the present invention allows immediate access to an animal's descriptive and performance records when the animal is under observation. Importantly, the system further provides a foundation for a value based marketing system for livestock.

We claim:

1. A livestock record system for identifying and monitoring individual animals comprising, in combination, an implantable programmable electronic identification and data storage module carried with an animal and self-powered over the lifetime of the animal, said module comprising means for storing identifying data unique to the animal, means for storing and processing cumulative performance data relating to the animal recorded over the lifetime of the animal, and means for receiving and transmitting said identifying and performance data, so that the animal's identification, performance data and the animal itself are one, said module further comprising a power source including means for minimizing power consumption by substantially removing power to said module when it is not accessed; and a reading and recording device for transmitting data to or receiving data from said identification and data storage module, said recording and receiving device constructed to read, add, or update data stored in said identification and data storage module.

2. The livestock record system as defined in claim 1 further comprising means for assuring the integrity of the identifying and performance data.

3. The livestock record as defined in claim 1 wherein said means for minimizing power consumption includes wake-up circuitry for signalling said module upon power-up when said module is accessed.

4. A livestock record system for identifying and monitoring individual animals, comprising, in combination, an implantable programmable electronic identification and data storage module carried with an animal and self-powered over the lifetime of the animal, so that the animal's identification, cumulative performance data recorded over the lifetime of the animal, and the animal itself are one, said module comprising, means for permanently storing fixed animal identification data, means for permanently storing said performance data, means for entering, revising, adding, and maintaining said performance data, means for transmitting said fixed identification data, means for receiving and transmitting said performance data, and a power source including means for minimizing power consumption by substantially removing power to said module when it is not accessed; and a reading and recording device for communicating with said electronic identification and data storage module, said reading and recording device comprising, means for retrieving identification and performance data from said electronic identification and data storage module, means for storing said retrieved data, means for transmitting information to said electronic identification and data storage module for entering performance data or for revising performance data stored in said module, means for inputting and controlling the communications with the electronic identification and data storage module, means for displaying information transmitted to or received from said module, means for receiving information to a computer and means for storing information received from a computer.

5. The livestock system as defined in claim 4 further comprising a computer means, said computer means including means for permanently storing data from said electronic identification and data storage module, means for transmitting and receiving data from said reading and recording means, and means for storing information received from said reading and recording device.

6. The livestock record system as defined in claim 5, wherein said computer means is a microcomputer.

7. The livestock record system as defined in claim 5, wherein said computer means is a microcomputer which is capable of transmitting and receiving communications with a central data center.

8. The livestock record system as defined in claim 4, wherein said reading and recording device is portable.

9. The livestock record system as defined in claim 4, wherein said electronic identification and data storage module includes defined locations for storing performance data including the birth data, parentage, growth characteristics, health and predicted performance of the animal.

10. The livestock record system as defined in claim 4, wherein said displaying means of said reading and recording device provides a human readable visual display.

11. The livestock record system as defined in claim 4, wherein said electronic identification and data storage module is an electronic integrated device.

12. The livestock record system as defined in claim 11, wherein said electronic identification and data storage module includes a health monitoring system.

13. The livestock record system as defined in claim 11, wherein said electronic identification and data storage module includes antenna means for transmitting and receiving communications.

14. The livestock record system as defined in claim 11, wherein said electronic identification and data storage module is powered by a self-contained battery.

15. The livestock record system as defined in claim 11, wherein said system is for use in the livestock industry and said electronic identification and data storage module is imprinted with an identification number.

16. The livestock record as defined in claim 4 wherein said means for minimizing power consumption includes wake-up circuitry for signalling said module upon power-up when said module is accessed.

17. The livestock record system as defined in claim 4, wherein said reading and recording device is portable, hand-held and pistol-shaped.

18. The livestock record system as defined in claim 17, wherein said means for displaying information is a display screen mounted on the upper surface of the reading and recording device.

19. The livestock record system as defined in claim 17, wherein said means for inputting and controlling said communications with the electronic identification and data storage module is an alphanumeric keypad.

20. The livestock record system as defined in claim 17, wherein said reading and recording device is powered by a rechargeable battery.

21. The livestock record system as defined in claim 17, wherein said reading and recording device includes means for analyzing retrieved data and means for verifying the integrity of the retrieved or transmitted data.

22. A method of maintaining livestock records for identifying and monitoring individual animals comprising:
implanting identification and performance data in an animal so that the animal's identification and performance data and the animal itself are one, wherein said data is stored in a programmable electronic identification and data storage module;
accessing the animal by retrieving the identification data implanted in the animal;
retrieving the performance data implanted in the animal;
transmitting updated performance data to the animal so that the animal's performance data is continuously maintained and accumulated in the animal over the lifetime of the animal; and
substantially removing power from said module when it is not being accessed.

23. The method as defined in claim 22 wherein the accessing, retrieving, and transmitting is performed with the programmable electronic identification and data storage module.

* * * * *

UNITED STATES PATENT AND TRADEMARK OFFICE
CERTIFICATE OF CORRECTION

PATENT NO. : 5,322,034

DATED : June 21, 1994

INVENTOR(S) : Richard L. Willham, Robert J. Weber, and Marwan M. Hassoun

It is certified that error appears in the above-identified patent and that said Letters Patent is hereby corrected as shown below:

Column 10, line 23, after "information" insert -- from a computer, means for transmitting information --.

Column 12, line 20, after the word "performed" insert -- with a reading and recording device which communicates --.

Signed and Sealed this

Twenty-fourth Day of October, 1995

Attest:

BRUCE LEHMAN

Attesting Officer

Commissioner of Patents and Trademarks